United States Patent
Lu

(10) Patent No.: US 10,704,528 B1
(45) Date of Patent: Jul. 7, 2020

(54) LIQUID-FILLED HYDROELECTRIC GENERATION DEVICE

(71) Applicants: Shun-Tsung Lu, Taichung (TW); Ta-Wei Lu, Taichung (TW)

(72) Inventor: Shun-Tsung Lu, Taichung (TW)

(73) Assignees: Shun-Tsung Lu, Taichung (TW); Ta-Wei Lu, Taichung (TW)

( * ) Notice: Subject to any disclaimer, the term of this patent is extended or adjusted under 35 U.S.C. 154(b) by 0 days.

(21) Appl. No.: 16/412,169

(22) Filed: May 14, 2019

(51) Int. Cl.
*F03B 13/08* (2006.01)
*F03B 3/12* (2006.01)
*F03B 13/10* (2006.01)
*H02K 7/18* (2006.01)

(52) U.S. Cl.
CPC ............ *F03B 13/086* (2013.01); *F03B 3/126* (2013.01); *F03B 13/08* (2013.01); *F03B 13/10* (2013.01); *H02K 7/1823* (2013.01); *F05B 2240/24* (2013.01)

(58) Field of Classification Search
CPC ........ F03B 13/086; F03B 3/126; F03B 13/08; F03B 13/10; H02K 7/1823; F05B 2240/24
See application file for complete search history.

(56) References Cited

U.S. PATENT DOCUMENTS

| | | | | |
|---|---|---|---|---|
| 4,396,842 A * | 8/1983 | Jhun | ..................... | F03B 13/086 290/1 R |
| 4,540,313 A * | 9/1985 | Broome | .................... | E02B 9/00 290/52 |
| 2004/0033409 A1* | 2/2004 | Coerlin | ............. | H01M 8/04119 429/414 |
| 2007/0222222 A1* | 9/2007 | Cook | .................... | F03B 13/148 290/53 |
| 2011/0204645 A1* | 8/2011 | Jacobson | ................ | F03B 13/08 290/54 |
| 2016/0330941 A1* | 11/2016 | Lu | .......................... | A01K 63/06 |
| 2018/0335012 A1* | 11/2018 | Pezzia | ..................... | F03B 17/04 |
| 2019/0366238 A1* | 12/2019 | Yu | ...................... | B01D 17/0214 |

* cited by examiner

*Primary Examiner* — Tulsidas C Patel
*Assistant Examiner* — Joseph Ortega
(74) *Attorney, Agent, or Firm* — Tracy M Heims; Apex Juris, pllc.

(57) ABSTRACT

A liquid-filled hydroelectric generation device has a storage unit and at least one generating set. The storage unit has at least one generating chamber mounted in a bottom thereof. Each generating chamber has a closed end in a top thereof and an open end in a bottom thereof, and is connected with at least one inlet pipe. Each inlet pipe is bent into an inverted L shape and has a top end connected to the generating chamber and a bottom end spaced from the bottom of the storage unit. The at least one generating set is mounted respectively in the at least one generating chamber. Each generating set has a driving shaft, at least one blade wheel assembly mounted on the driving shaft, and a generator connected to the driving shaft. The liquid-filled hydroelectric generation device generates power stably regardless of the flow rate of the water source.

20 Claims, 8 Drawing Sheets

LIQUID-FILLED HYDROELECTRIC GENERATION DEVICE

BACKGROUND OF THE INVENTION

1. Field of the Invention

The present invention relates to a generation device, and more particularly to a liquid-filled hydroelectric generation device which can generate power stably regardless of the flow rate of the water source.

2. Description of Related Art

With reference to FIG. 8, a conventional run-of-river hydropower system includes a canal 72 diverted from a main stream 71 and a water turbine 73 placed in the canal 72. The water flowing through the main stream 71 is diverted into the main stream 71 and the canal 72, and spins the water turbine 73 to drive a generator for generating electric power.

However, the conventional run-of-river hydropower system can generate electric power with a volume of water flowing through. A smaller volume of water in dry seasons may not have sufficient force to propel the water turbine 73 to generate power. The generating efficiency of the conventional run-of-river hydropower system is unstable and is affected by climate and seasons.

To overcome the shortcomings, the present invention tends to provide a liquid-filled hydroelectric generation device to mitigate or obviate the aforementioned problems.

SUMMARY OF THE INVENTION

The main objective of the invention is to provide a liquid-filled hydroelectric generation device which can generate power stably regardless of the flow rate of the water source, and the generating efficiency of the liquid-filled hydroelectric generation device is improved.

A liquid-filled hydroelectric generation device has a storage unit and at least one generating set. The storage unit has at least one generating chamber mounted in a bottom of the storage unit. Each one of the at least one generating chamber has a closed end formed on a top of the generating chamber and an open end formed on a bottom of the generating chamber, and is connected with at least one inlet pipe. Each one of the at least one inlet pipe is bent into an inverted L shape and has a top end connected to the generating chamber in a position near the top of the generating chamber and a bottom end being spaced from the bottom of the storage unit. The at least one generating set is mounted respectively in the at least one generating chamber. Each generating set has a driving shaft, at least one blade wheel assembly mounted on the driving shaft, and a generator connected to the driving shaft. Each one of the at least one blade wheel has a sleeve fixed around the driving shaft and multiple blades connected to the sleeve in a radial arrangement.

Other objects, advantages and novel features of the invention will become more apparent from the following detailed description when taken in conjunction with the accompanying drawings.

DETAILED DESCRIPTION OF PREFERRED EMBODIMENT

Figure 1:
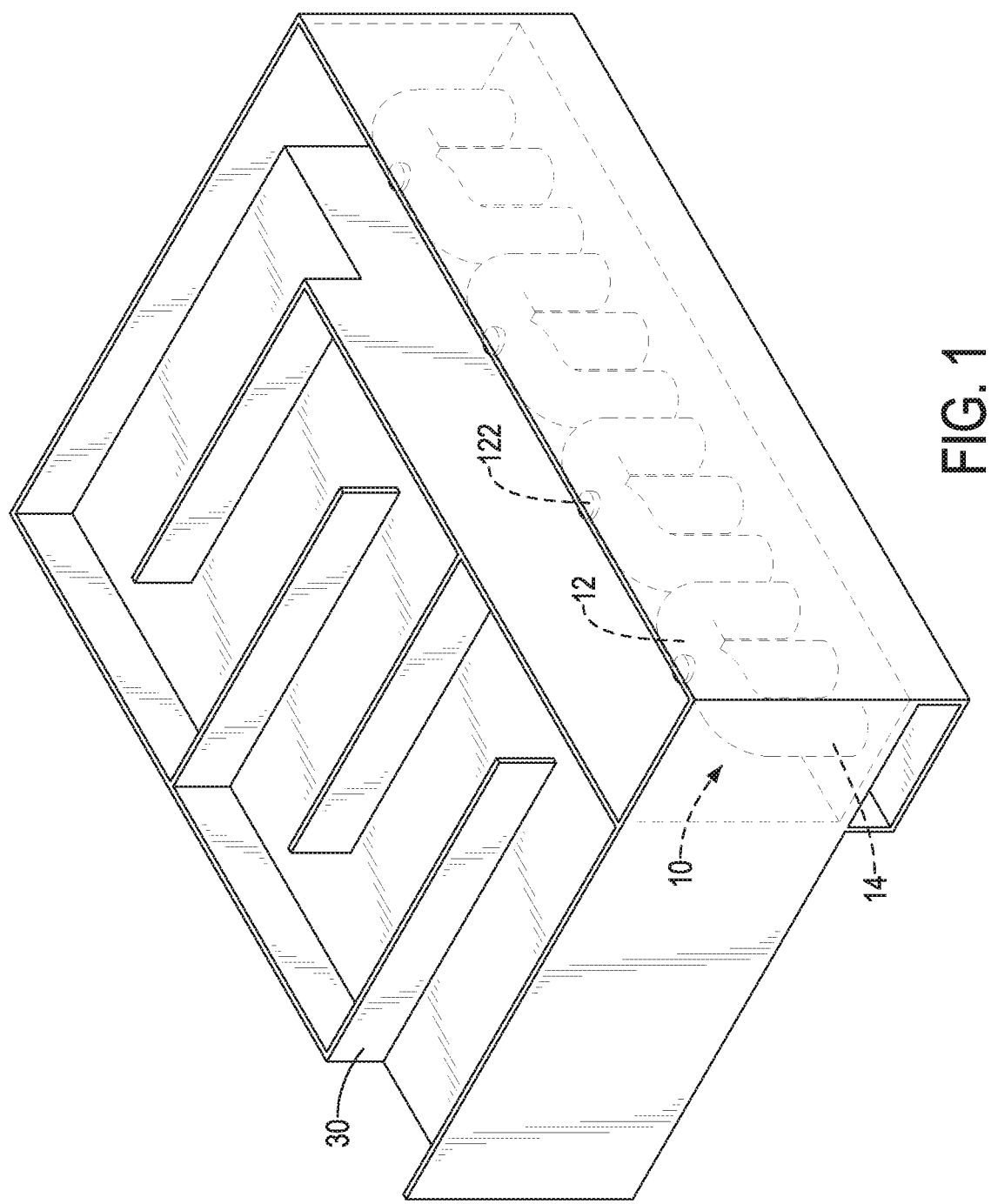
FIG. 1 is a perspective view of an embodiment of a liquid-filled hydroelectric generation device in accordance with the present invention.
Figure 2:
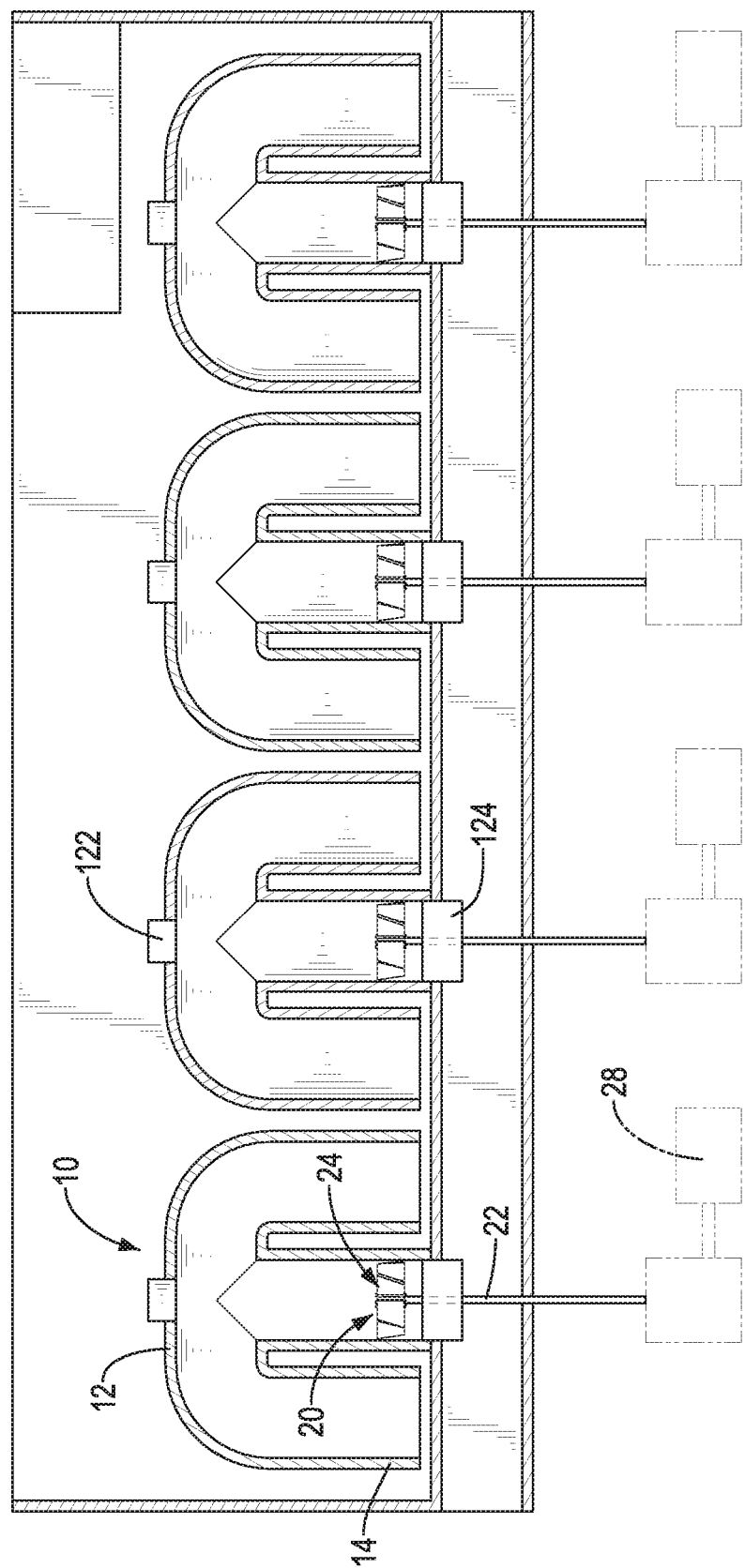
FIG. 2 is a front view in partial section of the liquid-filled hydroelectric generation device in FIG. 1.

With reference to FIGS. 1 and 2, a liquid-filled hydroelectric generation device in accordance with the present invention has a storage unit 10 and at least one generating set 20. The storage unit 10 communicates to a water source which may continuously supply water into the storage unit 10, such as river, cannel, and so on. The water from the water source will flow into the storage unit 10 and will be stored in the storage unit 10. The storage unit 10 may be formed as a barrel, a box, a tank, and so on. The storage unit 10 has at least one generating chamber 12 mounted in the bottom thereof. Each generating chamber 12 is formed as a hollow barrel and has a closed end formed on the top thereof and an open end formed on the bottom thereof. The top of each generating chamber 12 is under the top of the storage unit 10. Each generating chamber 12 is connected with at least one inlet pipe 14. Each inlet pipe 14 is bent into an inverted L shape. The top end of each inlet pipe 14 is connected to the generating chamber 12 at a position near the top of the generating chamber 12, and the bottom end of each inlet pipe 14 is spaced from the bottom of the storage unit 10.

Figure 3:
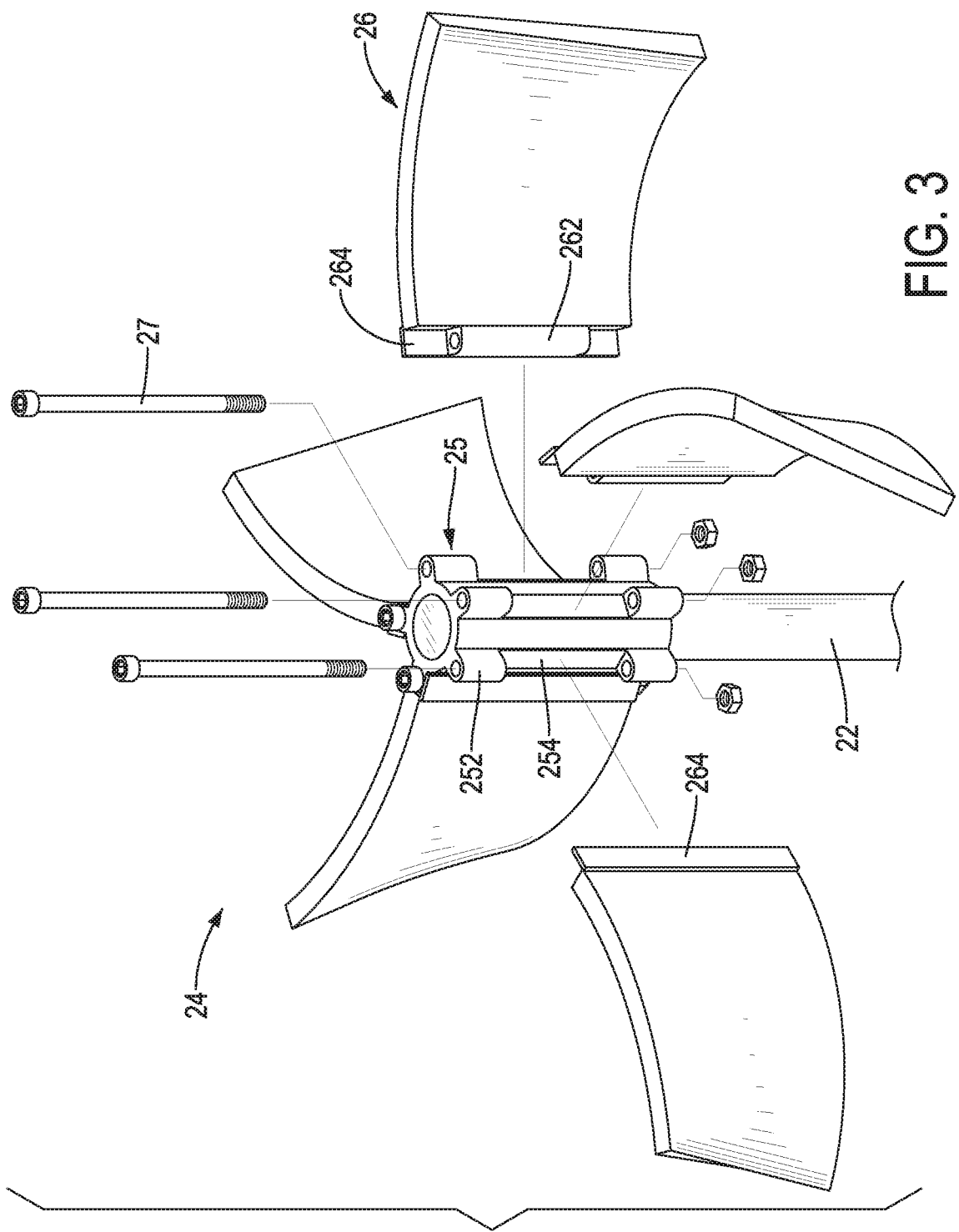
FIG. 3 is an exploded perspective view of a blade wheel assembly of the liquid-filled hydroelectric generation device in FIG. 1.

The at least one generating set 20 is mounted respectively in the at least one generating chamber 12. With reference to FIG. 3, each generating set 20 substantially has a driving shaft 22, at least one blade wheel assembly 24 mounted on the driving shaft 22, and a generator 28. Each blade wheel assembly 24 substantially has a sleeve 25 and multiple blades 26. The sleeve 25 is fixed around the driving shaft 22. Each blade 26 is connected to the sleeve 25. Preferably, each blade 26 is connected pivotally to the sleeve 25 in a unidirectional deflection. The sleeve 25 has multiple holders 252 protruding radially from the outer surface thereof. The holders 252 extend longitudinally and are arranged around the sleeve 25 at equiangular intervals. Each holder 252 has a pivoting cavity 254 recessed therein. Each blade 26 has a pivoting portion 262 formed as a hollow cylinder, protruding from an end thereof, and mounted in the pivoting cavity 254 of a respective one of the holders 252. An abutting plate 264 protrudes from the end of each blade 26 and abuts against a side of the respective one of the holders 252. The blade 26 is connected pivotally to the respective one of the holders 252 with a pivot 27 inserted through the holder 252 and the pivoting portion 262 of the blade 26.

The generator 28 is connected to the driving shaft 22 and is driven to generate electric power by the driving shaft 22. In this embodiment, the generator 28 is connected to the bottom of the driving shaft 22. The generator 28 may be conventional, and the detail thereof is omitted.

Figure 4:
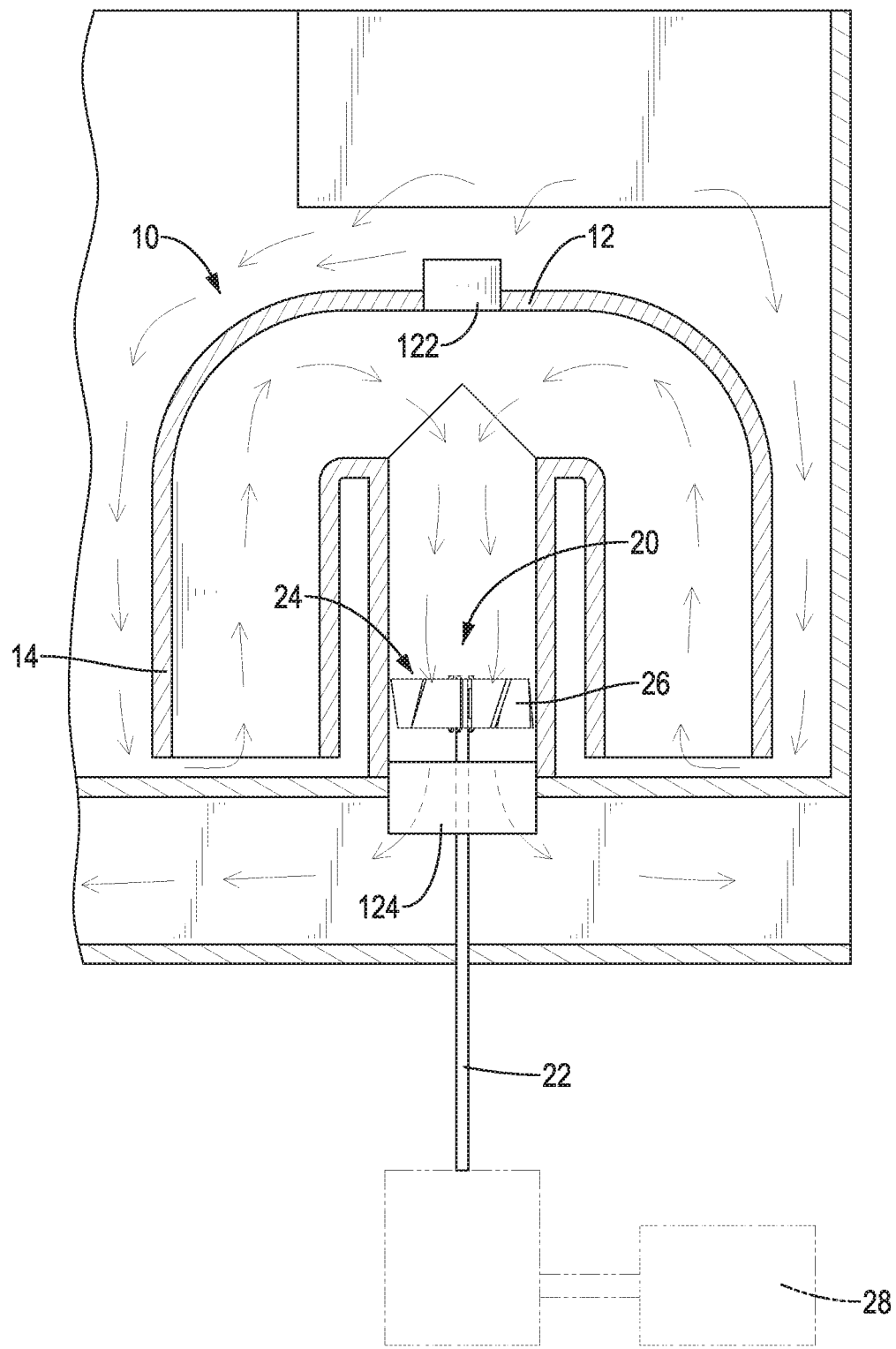
FIG. 4 is an enlarged operational front view in partial section of the liquid-filled hydroelectric generation device in FIG. 1.

With reference to FIGS. 1, 2, and 4, when the liquid-filled hydroelectric generation device in accordance with the present invention is used for the first time, water from the water source is led into the storage unit 10, and a water level of the storage unit 10 is rising. After the water level of the storage unit 10 is higher than the tops of the inlet pipes 14, the water inside the storage unit 10 will flow into the generating chamber 12 via the inlet pipes 14. The water will drop from a position near the top of the generating chamber 12 to the open end on the bottom of the generating chamber 12. Thus, the falling water will impact the blades 26 of the blade wheel assembly 24 and will propel the sleeve 25 to drive the driving shaft 22 to rotate. The generator 28 connected to the driving shaft 22 will be actuated to generate electric power.

Because the water is continuously supplied from the water source into the storage unit 10, the water level of the storage unit 10 can keep at a height. The water can continuously fall into the generating chamber 12 to drive the generating set 20 to generate electric power via the inlet pipes 14. When the water source has a smaller volume of water flowing through, the volume of water flowing into the storage unit 10 will be decreased, and the water level of the storage unit 10 will be lower. Because air inside the generating chamber 12 is exhausted with the falling water after the first use, the air pressure inside of the generating chamber 12 is lower than the air pressure outside. Due to siphon principle, the water stored in the storage unit 10 will be propelled into the generating chamber 12 via inlet pipes 14 by atmospheric pressure. Thus, the liquid-filled hydroelectric generation device in accordance with the present invention can continuously generate electric power regardless of changes of the flow rate of the water source. The power generating efficiency will be improved.

In addition, an exhaust valve 122 may be mounted in the top of the generating chamber 12. A drain valve 124 may be mounted in the open end in the bottom of the generating chamber 12 to close the open end. When the liquid-filled hydroelectric generation device in accordance with the present invention is used for the first time, the exhaust valve 122 is kept open, and the drain valve 124 is closed. When the water level of the storage unit 10 is rising, air inside the generating chamber 12 and the inlet pipes 14 is exhausted from the exhaust vent 122. After the water level of the storage unit 10 is higher than the top of the generating chamber 12, the generating chamber 12 and the inlet pipes 14 are filled with water without air. After that, the exhaust valve 122 is closed and the drain valve 124 is opened, the water inside the generating chamber 12 flows out from the drain valve 124 and impacts the generating set 20 to generate electric power. The generating chamber 12 will be kept in a low pressure near vacuum, and the water stored in the storage unit 10 will be completely propelled into the generating chamber 12 via the inlet pipes 14 by atmospheric pressure to continuously generate electric power.

Figure 5:
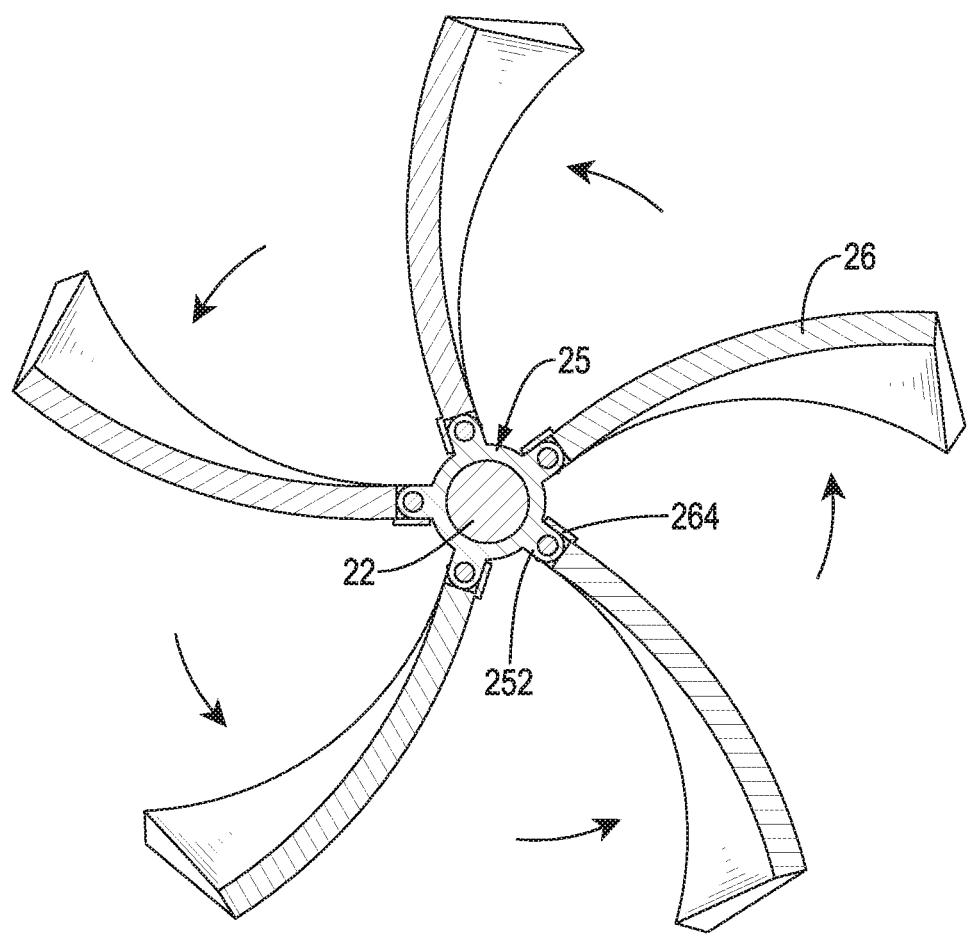
FIG. 5 is an operational sectional top view of the blade wheel assembly of the liquid-filled hydroelectric generation device in FIG. 3.
Figure 6:
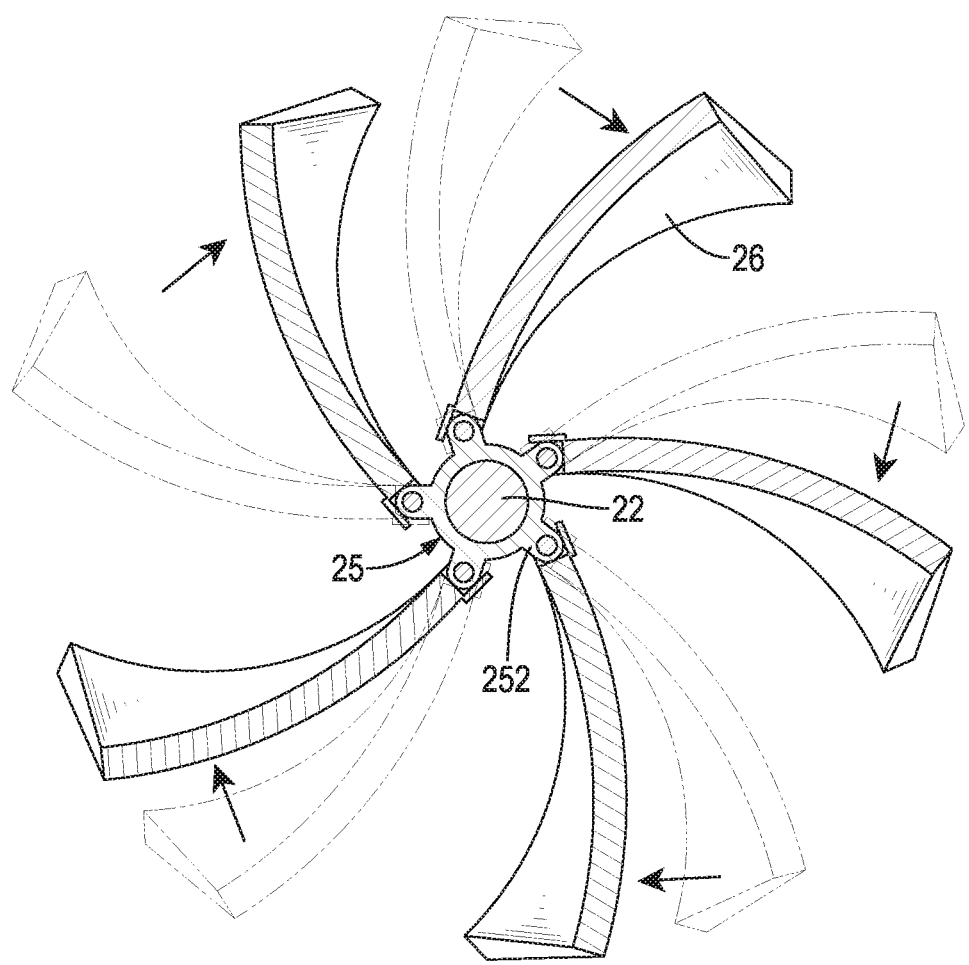
FIG. 6 is another operational sectional top view of the blade wheel assembly of the liquid-filled hydroelectric generation device in FIG. 3.

With reference to FIGS. 5 and 6, each blade 26 of the blade wheel assembly 24 is connected pivotally with the sleeve 25 in a unidirectional deflection. When water impacts the blades 26 in a positive direction, such as the counter-clockwise direction shown in FIG. 5, the abutting plates 264 of the blades 26 and holders 252 of the sleeve 25 will abut against each other, so the blades 26 will not pivot relative to the sleeve 25 and will propel the sleeve 25. When water impacts the blades 26 in a negative direction, such as the clockwise direction shown in FIG. 6, the blades 26 will be propelled to pivot relative to the sleeve 25, and the sleeve 25 will not be propelled to rotate. Thus, the driving shaft 22 can be prevent from reverse rotation by the water impact from the negative direction.

Figure 7:
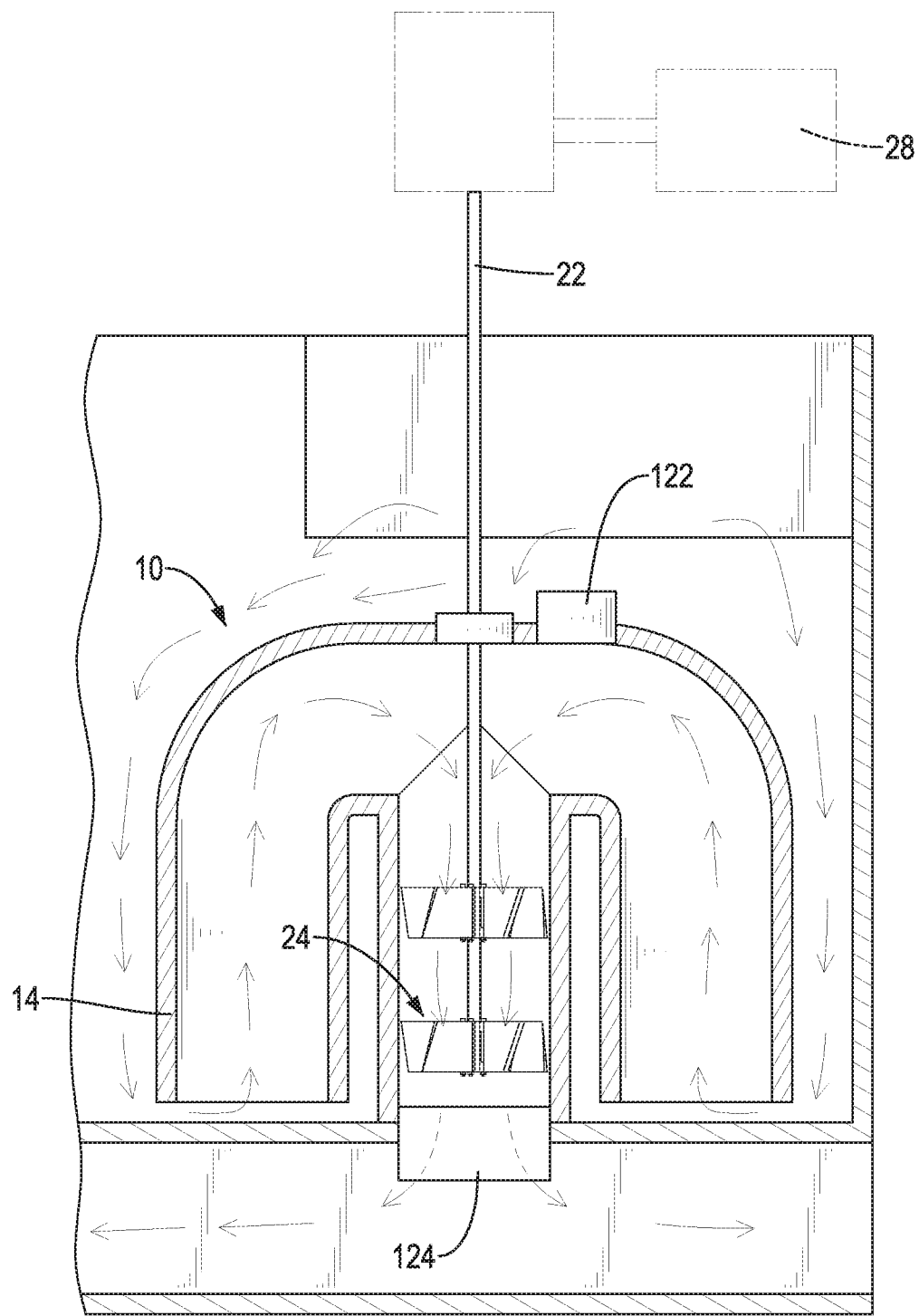
FIG. 7 is an operational front view in partial section of another embodiment of a liquid-filled hydroelectric generation device in accordance with the present invention.
Figure 8:
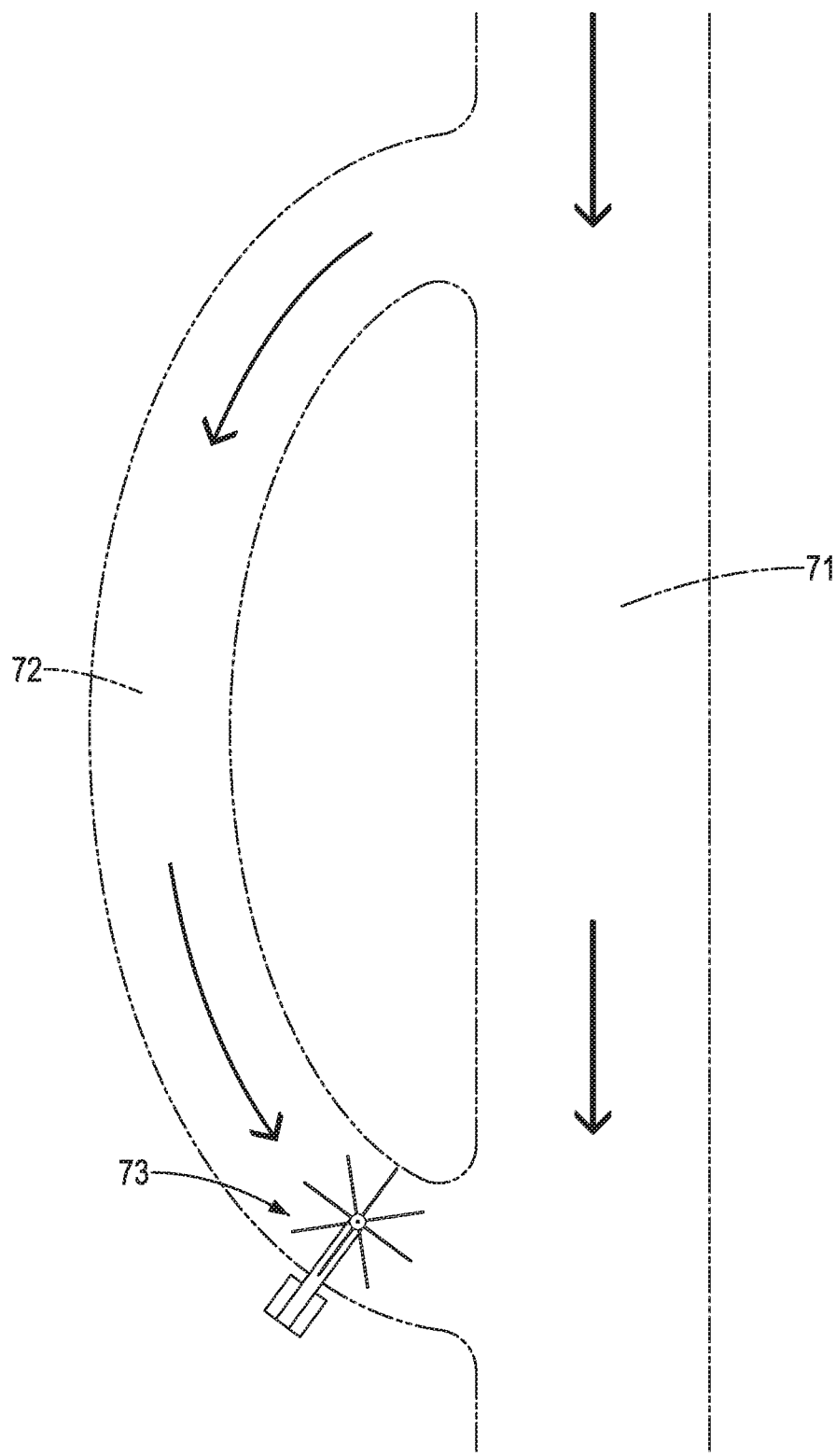
FIG. 8 is a top view of a conventional run-of-river hydropower system.

With reference to FIG. 7, in another embodiment of the liquid-filled hydroelectric generation device in accordance with the present invention, two blade wheel assemblies 24 are mounted on the driving shaft 22, the top of the driving shaft 22 protrudes from the top of the generating chamber 12, and the generator 28 is connected to the top of the driving shaft 22.

With reference to FIG. 1, the liquid-filled hydroelectric generation device in accordance with the present invention further has a guiding passage 30 communicating with the storage unit 10. The guiding passage 30 is in a position between the water source and the storage unit 10 and is formed in a meandering configuration. The water from the water source is guided to the storage unit 10 via the guiding passage 30. When the liquid-filled hydroelectric generation device in accordance with the present invention is set in a rapid flowing stream, water from the stream can flow smoothly into the storage unit 10 via the guiding passage 30.

With such arrangements, the generating sets 20 can be driven to generate electric power by water stored inside the storage unit 10. When water level of the storage unit 10 becomes lower in the dry season, the water stored inside the storage unit 10 can be propelled into the generating chamber 12 via the inlet pipes 14 to generate electric power due to siphon principle. The liquid-filled hydroelectric generation device in accordance with the present invention will not be affected by climate and seasons and can generate power stably. The generating efficiency is improved.

What is claimed is:

1. A liquid-filled hydroelectric generation device comprising:
    a storage unit having at least one generating chamber mounted in a bottom of the storage unit, and each one of the at least one generating chamber connected with at least one inlet pipe and having a closed end formed on a top of the generating chamber; and an open end formed on a bottom of the generating chamber, wherein each one of the at least one inlet pipe is bent into an inverted L shape and has a top end connected to the generating chamber at a position near the top of the generating chamber; and a bottom end being spaced from the bottom of the storage unit; and at least one generating set mounted respectively in the at least one generating chamber, each one of the at least one generating set having a driving shaft; at least one blade wheel assembly mounted on the driving shaft, and each one of the at least one blade wheel assembly having a sleeve fixed around the driving shaft; and multiple blades connected to the sleeve in a radial arrangement; and a generator connected to the driving shaft.

2. The liquid-filled hydroelectric generation device as claimed in claim 1, wherein each blade of each one of the at least one blade wheel assembly of each one of the at least one generating set is connected pivotally to the sleeve of the blade wheel assembly in a unidirectional deflection.

3. The liquid-filled hydroelectric generation device as claimed in claim 2, wherein
    the sleeve of each one of the at least one blade wheel assembly of each one of the at least one generating set has
        multiple holders protruding from an outer surface of the sleeve, extending longitudinally, and arranged around the sleeve at equiangular intervals, and each holder having a pivoting cavity recessed in the holder; and each blade of each one of the at least one blade wheel assembly of each one of the at least one generating set has
- a pivoting portion protruding from an end of the blade and mounted in the pivoting cavity of a respective one of the holders of the sleeve of the blade wheel assembly of the generating set; and
- an abutting plate protruding from the end of the blade and abutting against the respective one of the holders of the sleeve of the blade wheel assembly of the generating set; and multiple pivots are respectively inserted through the holders of the sleeve and the pivoting portions of the blades of each one of the at least one blade wheel assembly of each one of the at least one generating set.

4. The liquid-filled hydroelectric generation device as claimed in claim 3, wherein the generator of each one of the at least one generating set is connected to a bottom of the driving shaft of the generating set.

5. The liquid-filled hydroelectric generation device as claimed in claim 4, wherein each one of the at least one generating set includes two said blade wheel assemblies mounted on the driving shaft of the generating set.

6. The liquid-filled hydroelectric generation device as claimed in claim 5, wherein each one of the at least one generating chamber has an exhaust valve mounted in the top of the generating chamber and a drain valve mounted in the bottom of the generating chamber to close the open end of the generating chamber.

7. The liquid-filled hydroelectric generation device as claimed in claim 3, wherein
the driving shaft of each one of the at least one generating set has a top protruding from the top of each one of the at least one generating chamber; and
the generator of the generating set is connected to the top of the driving shaft.

8. The liquid-filled hydroelectric generation device as claimed in claim 3, wherein each one of the at least one generating chamber has an exhaust valve mounted in the top of the generating chamber and a drain valve mounted in the bottom of the generating chamber to close the open end of the generating chamber.

9. The liquid-filled hydroelectric generation device as claimed in claim 2, wherein the generator of each one of the at least one generating set is connected to a bottom of the driving shaft of the generating set.

10. The liquid-filled hydroelectric generation device as claimed in claim 9, wherein each one of the at least one generating set includes two said blade wheel assemblies mounted on the driving shaft of the generating set.

11. The liquid-filled hydroelectric generation device as claimed in claim 10, wherein each one of the at least one generating chamber has an exhaust valve mounted in the top of the generating chamber and a drain valve mounted in the bottom of the generating chamber to close the open end of the generating chamber.

12. The liquid-filled hydroelectric generation device as claimed in claim 2, wherein
the driving shaft of each one of the at least one generating set has a top protruding from the top of each one of the at least one generating chamber; and
the generator of the generating set is connected to the top of the driving shaft.

13. The liquid-filled hydroelectric generation device as claimed in claim 12, wherein each one of the at least one generating set includes two said blade wheel assemblies mounted on the driving shaft of the generating set.

14. The liquid-filled hydroelectric generation device as claimed in claim 2, wherein each one of the at least one generating chamber has an exhaust valve mounted in the top of the generating chamber and a drain valve mounted in the bottom of the generating chamber to close the open end of the generating chamber.

15. The liquid-filled hydroelectric generation device as claimed in claim 1, wherein the generator of each one of the at least one generating set is connected to a bottom of the driving shaft of the generating set.

16. The liquid-filled hydroelectric generation device as claimed in claim 15, wherein each one of the at least one generating set includes two said blade wheel assemblies mounted on the driving shaft of the generating set.

17. The liquid-filled hydroelectric generation device as claimed in claim 16, wherein each one of the at least one generating chamber has an exhaust valve mounted in the top of the generating chamber and a drain valve mounted in the bottom of the generating chamber to close the open end of the generating chamber.

18. The liquid-filled hydroelectric generation device as claimed in claim 1, wherein
the driving shaft of each one of the at least one generating set has a top protruding from the top of each one of the at least one generating chamber; and
the generator of the generating set is connected to the top of the driving shaft.

19. The liquid-filled hydroelectric generation device as claimed in claim 18, wherein each one of the at least one generating set includes two said blade wheel assemblies mounted on the driving shaft of the generating set.

20. The liquid-filled hydroelectric generation device as claimed in claim 1, wherein each one of the at least one generating chamber has an exhaust valve mounted in the top of the generating chamber and a drain valve mounted in the bottom of the generating chamber to close the open end of the generating chamber.

\* \* \* \* \*